United States Patent
Bourret et al.

(10) Patent No.: US 8,695,921 B2
(45) Date of Patent: Apr. 15, 2014

(54) AUTOMATIC METHOD AND DEVICE FOR AIDING THE PILOTING OF AN AIRPLANE

(75) Inventors: Thierry Bourret, Toulouse (FR); Pascale Louise, Toulouse (FR); Jean Muller, Tournefeuille (FR); Xavier Dal Santo, Blagnac (FR)

(73) Assignee: Airbus Operations (SAS), Toulouse Cedex (FR)

(*) Notice: Subject to any disclaimer, the term of this patent is extended or adjusted under 35 U.S.C. 154(b) by 169 days.

(21) Appl. No.: 13/113,632

(22) Filed: May 23, 2011

(65) Prior Publication Data

US 2011/0290947 A1    Dec. 1, 2011

(30) Foreign Application Priority Data

May 25, 2010   (FR) ..................................... 10 54024

(51) Int. Cl.
    *B64C 13/18*    (2006.01)
    *G05D 1/04*    (2006.01)

(52) U.S. Cl.
    USPC ......... 244/76 B; 244/75.1; 244/175; 244/194; 244/195; 701/11

(58) Field of Classification Search
    USPC .............. 244/175, 182, 194, 195, 75.1, 76 B; 701/11
    See application file for complete search history.

(56) References Cited

U.S. PATENT DOCUMENTS

| 3,682,417 | A | * | 8/1972 | Burklund et al. | 244/180 |
| 5,836,546 | A | * | 11/1998 | Gast | 244/76 B |
| 5,841,537 | A | | 11/1998 | Doty | |
| 7,302,316 | B2 | * | 11/2007 | Beard et al. | 701/11 |
| 2004/0250616 | A1 | | 12/2004 | Adebjork et al. | |

OTHER PUBLICATIONS

French Patent Office, International Search Report FR 1054024 (2 pgs.), Apr. 1, 2011.

* cited by examiner

*Primary Examiner* — Tien Dinh
*Assistant Examiner* — Michael Wang
(74) *Attorney, Agent, or Firm* — Wood, Herron & Evans, LLP

(57) ABSTRACT

A method of aiding the piloting of an airplane ensures the availability of an automatic pilot and a thrust regulation system on board the airplane. To this end, the method includes determining first information by measuring the actual airspeed of the airplane, and this first information is used to control the automatic pilot and the thrust regulation system in a primary mode during normal operations of the airplane. When the first information is lost by becoming unavailable or unreliable, the automatic pilot and the thrust regulation system are each controlled in a secondary mode by control parameters determined using additional flight data independent from the actual airspeed of the airplane and the first information. Consequently, an alternative or redundant control is supplied for ensuring the continued operation of an automatic pilot without necessary intervention from crew members on board the airplane.

12 Claims, 1 Drawing Sheet

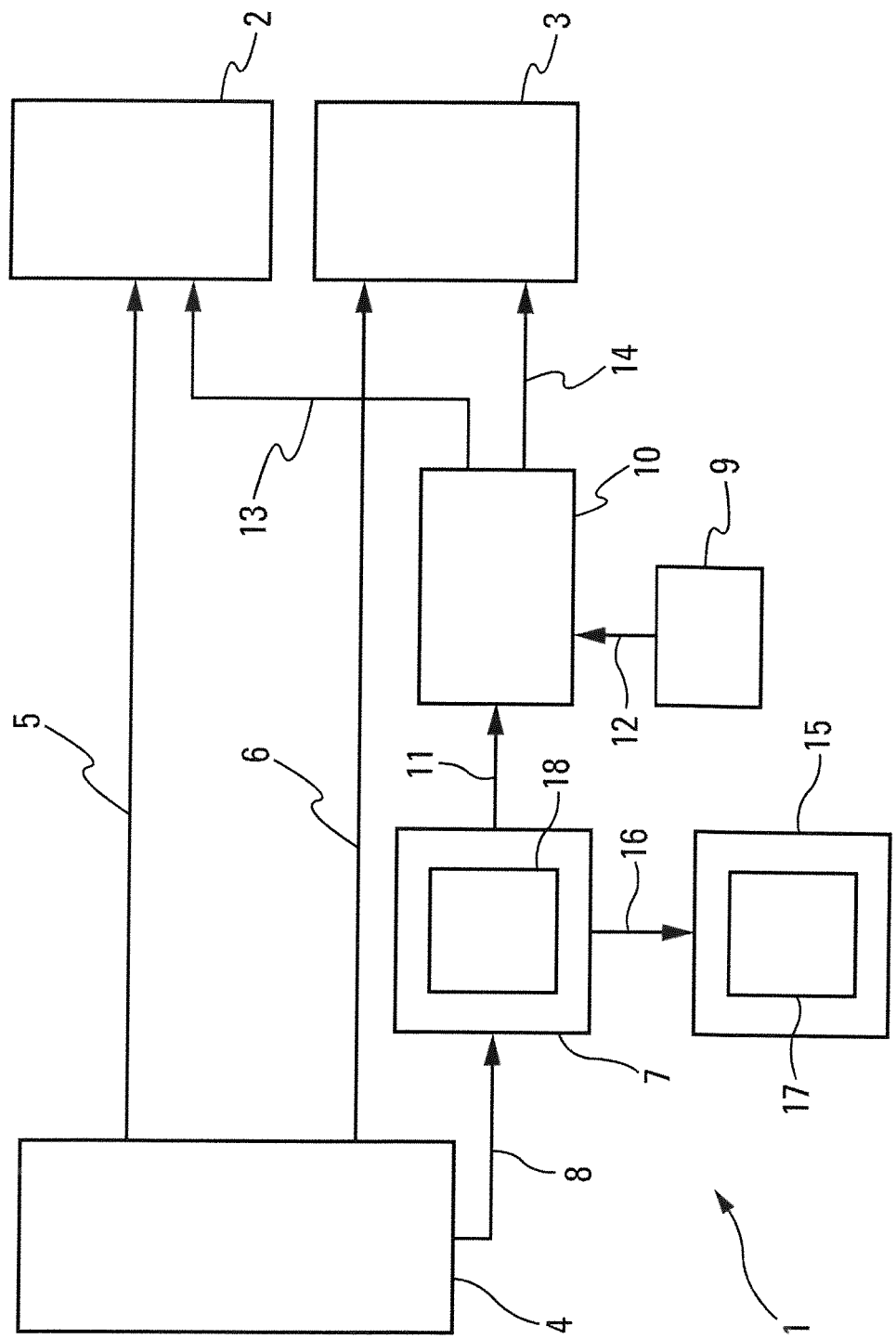

AUTOMATIC METHOD AND DEVICE FOR AIDING THE PILOTING OF AN AIRPLANE

TECHNICAL FIELD

The present invention relates to an automatic method and device for aiding the piloting of an airplane, in particular a transport airplane, for commanding an automatic pilot and optionally, a thrust regulation system for the airplane.

BACKGROUND

As known, the automatic pilot of a transport airplane, either coupled or not to a thrust regulation system, uses speed information in order to maintain a selection of the pilot and/or the speed field to values acceptable for the airplane.

If, during piloting, such speed information is lost, that is if it becomes unavailable, erroneous, or unreliable, the automatic pilot and/or the thrust regulation system automatically disengage and/or maintain the current state of the airplane, leaving to the crew the charge of managing the situation.

Such a situation could occur, for example should the Pilot probes generally used for measuring the speed of the airplane, become iced-up. Such a situation is however exceptional, as most airplanes are provided with systems allowing the effects of icing to be limited or cancelled.

Such a disengagement of the automatic pilot and/or the thrust regulation system induces an additional workload for the crew that should process the cause of the breakdown, in addition to the usual tasks, and this, in an unusual situation wherein the speed information is lost.

The speed information is a primary parameter used by the automatic pilot, for defining the flight area of the airplane (high and low limits) and the dynamics of the airplane. An automatic pilot or a thrust regulation system that would not respect such speed limits would lead the airplane to be unstalled or in an overspeed situation able to lead to structural damages. For this reason, the automatic pilot and the thrust regulation system are provided with different usual means protecting the speed area.

Consequently, when the speed information is lost, it is not possible to ensure the basic function of the automatic pilot and the thrust regulation system in their current concepts, nor the protective functions of the flight area.

It should be furthermore noticed that current automatic pilot and thrust regulation system contain a high number of different operating modes each corresponding to an objective the crew can select as a function of their intentions. Learning such different modes and the transitions thereof represents a significant part of the crews' training. Thus, introducing new operating modes of the automatic pilot and/or of the thrust regulation system generally requires a new learning phase, and even repeated training phases, if this mode is only of use in exceptional cases that generally do not occur in a normal use of the airplane.

The present invention relates to an automatic method for aiding the piloting of an airplane, allowing to ensure the availability of at least one automatic pilot (able to be controlled as a function of a speed information), having the aim to overcome the above mentioned drawbacks.

SUMMARY OF THE INVENTION

To this end, according to this invention, said method is remarkable in that, automatically:
  said speed information is monitored so as to be able to detect a loss thereof; and
  should a loss of speed information be detected, the following operations are carried out:
    the usual values of flight data of the airplane are determined, being independent from said speed information;
    control parameters are determined from said usual values of flight data; and
    such control parameters are used for ensuring the availability at least of said automatic pilot.

Within the scope of this invention, it is considered that a speed information is lost, when:
  it is not available, for example as a result of a breakdown of the measurement device or the information transmission device; or
  it is available, but is erroneous or is not reliable. Such speed information is considered as not reliable, when it cannot be consolidated (for example as a result of the availability of one single source of information). It could be considered as erroneous when it meets some unlikelihood criteria.

Thus, according to this invention, should the speed information be lost, when being used more particularly by the automatic pilot, control parameters are determined by means of flight data that are independent from such a speed information, and these control parameters are used for ensuring the availability at least of said automatic pilot. Consequently, in such a situation of loss of the speed information, the automatic pilot should not be disengaged, but can go on operating, while maintaining the maximum of margin with respect to the authorized speed area, as set forth herein below. Such maintenance of the engagement of the automatic pilot makes it possible to overcome the above mentioned drawbacks, more particularly with respect to the crews' workload.

In a preferred embodiment, said method is also implemented for ensuring the availability, additionally, of an (automatic) thrust regulation system of the airplane. In this preferred embodiment, should the speed information be lost, said control parameters are used for also ensuring the availability of said thrust regulation system.

The present invention could also be implemented with or without control of a thrust regulation system of the airplane.

Furthermore, advantageously, should a loss of the speed information be detected:
  an alarm is emitted to the crew of the airplane for example, as a synthetic piece of information; and/or
  said speed information is still monitored, and should an end of a loss of speed information be detected, that is when said information is no longer lost, such a speed information is used again as a parameter for controlling said automatic pilot (and optionally said thrust regulation system).

In a particular embodiment, an automatic pilot is used, operating each time according to one of a plurality of possible different vertical guidance modes. In such a case, advantageously, some of said possible vertical guidance modes are selected, being referred to as selected vertical guidance modes, and, should a loss of the speed information be detected, said automatic pilot is operated according to one of said selected vertical guidance modes.

Preferably, said selected vertical guidance modes comprise:
  an altitude maintaining mode for said automatic pilot, optionally associated with a speed maintaining mode for said thrust regulation system;
  a constant thrust climbing mode, associated with a thrust maintaining mode; and a constant thrust descending mode, associated with a thrust maintaining mode.

Such three selected vertical guidance modes allow:

the crew to better understand the current operating mode. The use is further simplified, as the usual interfaces, enabling to select a reference altitude and to generate level changes (climbing/descending) or level flying, remain unchanged;

to manage to the best all the flight situations, for which the automatic pilot is used (maintaining the flying level, climbing then capture/maintaining the flying level, descent then capture/maintaining the flying level); and to obtain a guidance of the airplane, at short and medium terms, being consistent with the initial objectives of the crew, and this, whatever the initial situation upon the loss of speed information.

In a first embodiment, the attitude of the airplane is used as a control parameter of the automatic pilot, and the engine speed as a control parameter of the thrust regulation system. Advantageously, such values are selected so as to maintain the speed of the airplane in the center of the flight area (so as to maximize the margins with respect to the minimum and maximum limits).

Preferably, said attitude and engine speed values are selected identical to the values currently supplied to the crew, in the usual procedure that the crew is to apply in the case of speed information being lost when the automatic pilot is no longer available.

Moreover, in a second embodiment, the incidence of the airplane is used as a control parameter of the automatic pilot, and the engine speed as a control parameter of the thrust regulation system. Advantageously, such a value of incidence is selected at the centre of the incidence field, that could be displayed, usually, instead of the speed scale, in the case of a loss of the speed information.

In a particular alternative embodiment, said first and second embodiments are combined so as to cover complementary flight areas. To this end, advantageously:

when the airplane is in a smooth aerodynamic configuration, the attitude of the airplane and the engine speed of the airplane are used as control parameters; and when the airplane is in a sustained aerodynamic configuration, the incidence of the airplane and the engine speed are used as control parameters.

Within the scope of this invention, an aerodynamic configuration of the airplane means the position of the slats and flaps of the aerofoils of the airplane. Moreover, in a so-called smooth aerodynamic configuration, the slats and flaps are not extended, whereas in so-called sustained aerodynamic configurations, the slats and flaps are approximately extended.

The present invention further relates to an automatic device for aiding the piloting of an airplane, said device being of the type comprising an automatic pilot and optionally a thrust regulation system that are able to be controlled as a function of a speed information.

According to this invention, said device is remarkable in that it further comprises:

a speed information validation device for monitoring the speed information so as to be able to detect a loss thereof;

a flight data value determination device for determining, in the case where a speed information is lost, the usual values of flight data of the airplane, being independent from the speed information; and a control parameters determination device for determining, from the usual values of flight data, control parameters, such control parameters being used for ensuring the availability at least of the automatic pilot (and optionally of the thrust regulation system).

The present invention further relates to an aircraft, in particular a transport airplane, comprising such a device.

BRIEF DESCRIPTION OF THE DRAWING

The unique FIG. of the appended drawing will better explain how this invention can be implemented. This unique FIG. is the block diagram of a device according to this invention.

DETAILED DESCRIPTION

The device 1 according to this invention and schematically shown on the FIG. is intended to provide an aid to the piloting of an airplane (not shown), in particular of a transport airplane, including an automatic pilot 2 and an (automatic) thrust regulation system 3 (A/THR).

Such an automatic pilot 2 and such a thrust regulation system 3 could be usually controlled during normal operation as a function of a speed information of the airplane(e.g., as a function of information corresponding to the actual airspeed of the airplane). This speed information is determined by a usual airplane speed detection 4, for example an air data and reference inertial unit, including of the ADIRU type (<<Air Data Reference Inertial Unit>>), and is transmitted via links 5 and 6 respectively to the automatic pilot 2 and to the system 3.

According to this invention, the device 1 further includes:

a speed information validation device 7 being connected via a link 8 to the airplane speed detection device 4 and monitoring the speed information so as to be able to detect a loss of the latter;

a flight data value determination device 9 for determining, in the case where a speed information loss is detected, the usual values of flight data of the airplane, to be described later on, being independent from the speed information; and a control parameters determination device 10 being connected via links 11 and 12 respectively to the speed information validation device 7 and the flight data value determination device 9 and being formed so as to determine, from the usual values of flight data received from the flight data value determination device 9, control parameters.

Such control parameters are then transmitted via links 13 and 14 respectively to the automatic pilot 2 and to the thrust regulation system 3, in order to ensure the availability at least of the automatic pilot (and optionally of the system 3), as described hereinbelow.

Within the scope of the present invention, it is considered that a speed information is lost, when:

the speed information is not available, for example as a result of a breakdown of the measurement device (e.g., the airplane speed detection device 4) or of the information transmission device (e.g., link) being used; or even the speed information is erroneous or not reliable. A speed information is considered as not reliable, when it cannot be consolidated (for instance when only a single source of information works normally). In addition, a speed information is considered as erroneous when it meets some unlikelihood criteria.

In a particular embodiment, such a detection takes into consideration, for example:

the detection of an abnormal drop of the speed value, for instance a drop by 30 kts (knots) in less than one second; and/or an lack of validation of two of the three speed measurements, generally carried out on the airplane.

Thus, in the case of a loss of the speed information being used, more specifically, by the automatic pilot 2 and the system 3, the device 1 according to this invention determines control parameters from flight data being independent from such a speed information, and it uses such control parameters for said automatic pilot 2 (and optionally said system 3). Consequently, in such a situation, the automatic pilot 2 and (optionally) the system 3 are not disengaged, but they can continue to operate, while maintaining the maximum of margin, with respect to the authorized speed area, as described hereinbelow. Such maintenance of the operation of the automatic pilot 2 and of the system 3 allows, more specifically, the workload of the crew not to be increased in such a situation of loss of the speed information.

Moreover, the device 1 further includes:

an alarm device 15 being, for example, connected via a link 16 to the speed information validation device 7 and which, in the case where a loss of the speed information is detected, emit an alarm to the crew, for instance, in the form of a synthetic information being displayed on a screen 17 of the cockpit; and a monitoring continuation device 18 being, for instance, integrated into the speed information validation device 7 and continuing to monitor the speed information, upon the detection of a loss of such a speed information.

Generally, the meteorological phenomena causing a loss of the speed information, such as icing for example, are not permanent. Such phenomena generally have a limited duration over time. Thus, although the operating mode of the automatic pilot 2 according to this invention, allowing an operation without any speed information, is able to be used until the end of the flight, it could be interesting not to maintain this operating mode and to turn back to a usual operating mode, when the speed information becomes valid again.

Consequently, in a particular embodiment, in the case of the detection by the monitoring continuation device 18 of an end of the loss of speed information, the device 1 again uses such a speed information, usually, for the automatic pilot 2 (and optionally for the thrust regulation system 3).

It should be noted that, in cases where the speed information is erroneous or not reliable as upon icing, for instance, the altitude information being derived from a pressure measurement remains available, as it is measured by a probe that is not submitted to the problem linked to icing. The measurement could be slightly erroneous, as it is no longer correctly compensated by Mach effects, but such an error remains small. In addition, if the altitude measurement derived from a pressure measurement is not available, it is possible to use a measurement obtained from a satellite positioning system of the GNSS type.

In a particular alternative, the desired flight point (reference speed) for the airplane is determined as a function of the altitude (Zmes) of the airplane so as to be sufficiently remote from the high and low limits of the flight area.

A usual automatic pilot 2 generally has numerous vertical guidance modes, as set forth hereinbelow as a non exhaustive illustration. With each vertical guidance mode a mode of the thrust regulation system 3 is associated.

| Vertical guidance mode of the automatic pilot 2 | Mode of the thrust regulation system 3 |
|---|---|
| ALT: Altitude maintenance | SPEED: Speed maintenance |
| ALT*: Altitude capture | SPEED: Speed maintenance |
| SRS: Initial climbing and nosing up | THR: Maintenance of a thrust |
| OP CLB: Constant thrust climbing | THR: Maintenance of a thrust |
| OP DES: Constant thrust descent | THR: Maintenance of a thrust |
| VS: Maintenance of a vertical speed | SPEED: Speed maintenance |
| FPA: Maintenance of a slope | SPEED: Speed maintenance |
| CLB: Climbing according to a profile | THR: Maintenance of a thrust |
| DES: Descent according to a profile | SPEED or THR according to the profile |
| G/S: Maintenance of a «glide» axis | SPEED: Speed maintenance |
| G/S*: Capture of a «glide» axis | SPEED: Speed maintenance |

In such a case, the device 1 selects some of said possible different vertical guidance modes, being referred to as selected vertical guidance modes and, in the case where the speed information is lost, it actuates said automatic pilot 2 according to one of said selected vertical guidance modes.

In a particular embodiment, the device 1 only uses the following selected vertical guidance modes: ALT/SPEED, OP CLB/THR and OP DES/THR.

Such three selected modes allow:

to facilitate understanding by the crew of the usual operating mode. The use is further simplified, as the usual interfaces, allowing to select a reference altitude and to generate level changes (climbing/descending) or level flying, remain unchanged;

to manage to the best all the flight situations, for which the automatic pilot 2 is used (maintaining the flying level, climbing then capturing/maintaining the flying level, descent then capture/maintenance of the flying level); and to obtain a guidance of the airplane, at short and medium terms, being consistent with the initial objectives of the crew, and this, whatever the initial situation upon the loss of speed information.

The transitions between the initial state of the automatic pilot 2 upon the detection of the loss of the speed information and the final mode could be determined as follows (with VSt a vertical speed and FPAt the slope):

| Initial vertical guidance mode (before detection) | Resulting mode (without speed information) |
|---|---|
| ALT, ALT* | ALT |
| SRS, OP CLB, CLB | OP CLB |
| OP DES | OP DES |
| (|VSt|<500 pieds/min) (|FPAt|<1°) | ALT |
| (|VSt|<500 pieds/min) (|FPAt|<1°) | OP CLB |
| (|VSt|<500 pieds/min) (|FPAt|<1°) | OP DES |
| G/S, G/S* | ALT |

Thanks to the alarm device 15, the crew can be informed of the new operating mode of the automatic pilot 2 (or of the system 3), of its limitations and of possible changes of modes that have occurred. In a particular alternative, a synthetic information, for instance <<AP Alternate>>, being displayed on the screen 17 could be sufficient for understanding the new operating mode of the automatic pilot 2.

In a first embodiment, the device 1 uses the attitude of the airplane as a control parameter of the automatic pilot 2, and the engine speed as a control parameter of the thrust regulation system 3. Preferably, such values are selected so as to maintain the speed of the airplane in the centre of the flight area (so as to maximize the margins with respect to the minimum and maximum limits).

Moreover, preferably, said attitude and engine speed values are selected to be identical to the values currently supplied to the crew, in the usual procedure that the crew are to apply in the case of speed information being lost when the automatic pilot 2 is no longer available. In a first possibility of this first embodiment, a guidance objective is considered according to the ALT mode.

In the usual ALT mode, the automatic pilot 2 maintains an altitude, generally the altitude selected on the control unit (FCU) of the automatic pilot 2. At the flight point determined by the altitude of the airplane (Vref, Zmes), knowing the aerodynamics of the airplane, it is possible to determine, usually, the attitude $\theta$ref and the engine speed N1ref as a function of the bulk (m) and of the aerodynamic configuration (conf) allowing for a stabilized level flying:

$$\Theta\text{ref}=f(\text{conf},m,Zmes)$$

$$N1\text{ref}=f(\text{conf},m,Zmes)$$

In the case of the speed information being lost, the automatic pilot 2 slaves such an attitude value $\theta$ref and the thrust regulation system 3 applies said engine speed N1ref.

As a result of modeling errors, the balance point resulting from such values being slaved is close to the level, but is able to slowly deviate, and to make its operation incomprehensible to the crew. Thus, the attitude used by the automatic pilot 2 is, on the one hand, adjusted so as to maintain the level flying, and on the other hand, limited so as, more specifically, to avoid too high an angle of attack likely to lead to stalling. Such a correction is further filtered so as to only keep the long term component allowing deviations to be avoided.

Furthermore, the difference $\theta$adj between the attitude $\theta$u determined for maintaining the level flying and the reference attitude $\theta$ref is introduced again as an adjustment on the reference engine speed N1ref. The exchange rate between a thrust variation and the engine speed being generally known in the system 3, it is easy to convert an attitude variation (similar to a slope variation) into a thrust variation and, thus into a engine speed variation.

In this embodiment, the reference values $\theta$ref and N1ref are identical, for the same bulks and flight levels, to those indicated in tables made available to the crew in the case of speed being lost.

The value $\theta$adj corresponds to the adjustment allowing for compensating the difference between the model of the airplane and the aerodynamics of the airplane.

In a second possibility of the first above mentioned embodiment, a guidance objective is considered according to one of the OP CLB or OP DES modes.

In a climbing/descent mode (respectively OP CLB/OP DES) the system 3 is maintained to the minimum/maximum (respectively Idle/CLB).

As the thrust is rigid, the automatic pilot 2 slaves an attitude ($\theta$refCLB, $\theta$refDES) being determined, usually, as a function of the bulk (m) and of the altitude of the airplane (Zmes) knowing the reference speed (Vref) and the aerodynamic configuration (conf):

$$\theta\text{refCLB}=f(\text{conf},m,Zmes)$$

$$\theta\text{refDES}=f(\text{conf},m,Zmes)$$

Preferably, such values are identical, for the same flight bulks and levels, to those indicated in usual tables, made available to the crew, in the case of speed being lost.

Furthermore, the value $\theta$adj corresponding to the adjustment allowing to compensate for the difference between the model of the airplane and the aerodynamics of the airplane, could be also memorized and used in the OP CLB and OP DES modes so as to compensate for the differences between the model of the airplane and the aerodynamics of the airplane.

In this first embodiment, when the system 3 is not engaged, the above described operating mode of the automatic pilot 2 does not allow to maintain the airplane in an acceptable speed area if the effective engine speed is significantly different from the reference speed.

Thus, in this case, the attitude used by the automatic pilot 2 is adjusted so as to compensate for the difference between the current speed N1act and the reference speed N1ref.

An alternative comprises determining the attitude $\theta$u used by the automatic pilot 2 as a function of the bulk, the altitude and the current engine speed:

$$\theta u=f(\text{conf},m,Zmes,N1\text{act}).$$

In these implementations, the attitude values are determined so as to correspond to table values supplied in the usual procedures, when the current engine speed corresponds to values of those tables.

In these implementations, the crew could manually adjusting the thrust, maintain the level flying, bring the airplane in a descent mode (reducing the throttle lever) or in a climbing mode (increasing the throttle lever).

Such an operating mode of the automatic pilot 2 is thus acceptable for all the flight phases of the airplane.

Furthermore, in a second embodiment, the device uses the angle of attack of the airplane as a control parameter of the automatic pilot 2, and the engine speed as a control parameter of the thrust regulation system 3. Preferably, such a value of angle of attack is selected at the centre of the angle of attack field, that could be displayed, usually, instead of the speed scale, in the case of a loss of the speed information.

In a first possibility of this second embodiment, a guidance objective is considered according to the ALT mode.

Similarly to the first above mentioned embodiment, the automatic pilot 2 and the thrust regulation system 3 could slave an altitude using the reference angle of attack (determined from the configuration) and an engine speed N1ref determined for maintaining the level flying at the reference angle of attack $\alpha$ref:

$$A\text{ref}=f(\text{conf})$$

$$N1\text{ref}=f(\text{conf},m,Zmes)$$

Furthermore, the angle of attack used by the automatic pilot 2 is adjusted so as to maintain the level flying, and it is limited so as, more specifically, to avoid too high an angle of attack angle of attack likely to lead to stalling. Such a correction is further filtered so as to only keep the long term component allowing deviations to be avoided.

Moreover, the difference between the angle of attack determined for maintaining the level flying and the reference incidence $\alpha$ref is introduced again as an adjustment on the reference engine speed N1ref. The exchange rate between a thrust variation and the engine speed being generally known in the system 3, it is easy to convert an angle of attack variation (similar to a slope variation) into a thrust variation and, thus into a engine speed variation.

In a second possibility of the first above mentioned embodiment, a guidance objective is considered according to one of the OP CLB or OP DES modes.

In this case, the reference angle of attack $\alpha$ref can also be used for climbing or descent, while adapting through the system 3 the engine speed to a minimum value (Idle) for the descent and to a maximum value (CLB) for the climbing. The automatic pilot 2 slaves the angle of attack as a function of the thrust.

Furthermore, when the system 3 is not engaged, the operating mode of the above described automatic pilot 2 allows the airplane to be maintained in an acceptable angle of attack area. The pilot could, through thrust adjustments, select the slope of the airplane (approximately maintaining the level flying, climbing, descent).

Furthermore, in a particular alternative embodiment, said first and second embodiments are combined so as to cover complementary flight areas. In such a case:
- when the airplane is in a smooth aerodynamic configuration (with unextended slats and flaps), the device 1 uses as control parameters the attitude of the airplane and the engine speed; and
- when the airplane is in a sustained aerodynamic configuration (slats and flaps are more or less extended), the device 1 uses as control parameters the angle of attack of the airplane and the engine speed.

The invention claimed is:

1. A method for aiding the piloting of an airplane by ensuring the availability of an automatic pilot that is able to be controlled as a function of a first information defined by an actual airspeed of the airplane, the method comprising the following steps, performed automatically:
   determining the first information by measuring the actual airspeed of the airplane with airspeed measurement sensors during normal operation of the airplane;
   controlling the automatic pilot in a primary mode based on the first information during normal operation of the airplane;
   monitoring whether the first information is lost by determining if the airspeed measurement sensors have broken down or if measurements of the actual airspeed cannot be consolidated because only a single airspeed measurement sensor is operating correctly; and
   immediately upon detection that the first information is lost, controlling the automatic pilot in a secondary mode by performing the following operations without requiring additional action from crew members onboard the airplane:
      determining additional flight data of the airplane, the additional flight data being independent from the actual airspeed of the airplane;
      determining a set of control parameters from the additional flight data; and
      controlling the automatic pilot based on the set of control parameters such that operation of the automatic pilot is not interrupted by the first information being lost; and
      immediately upon detection that the first information is available again, controlling the automatic pilot in the primary mode again based on the first information such that operation of the automatic pilot is not interrupted by the first information being lost and then determined to be available again.

2. The method according to claim 1, wherein the automatic pilot is configured to operate according to one of a plurality of possible different vertical guidance modes, and the method further comprises:
   when controlling the automatic pilot in the primary mode during normal operation of the airplane, using any one of the possible different vertical guidance modes for performance by the automatic pilot; and
   when controlling the automatic pilot in the secondary mode during a loss of the first information, using one of a subset of vertical guidance modes authorized for use in the secondary mode, referred to as selected vertical guidance modes, for performance by the automatic pilot.

3. The method according to claim 2, wherein the subset of selected vertical guidance modes authorized for use in the secondary mode comprises:
   an altitude maintenance mode:
   a constant thrust climbing mode; and
   a constant thrust descent mode.

4. The method according to claim 1, wherein if the first information is lost, the method further comprises:
   emitting an alarm to the crew members of the airplane.

5. The method according to claim 1, wherein the airplane also includes a thrust regulation system, and the method further comprises:
   during normal operation of the airplane, controlling the thrust regulation system in a primary mode based on the first information; and
   if the first information is lost, controlling the thrust regulation system in a secondary mode based on the set of control parameters.

6. The method according to claim 5, wherein controlling the automatic pilot and the thrust regulation system in the secondary modes further comprises:
   controlling the automatic pilot based on an attitude of the airplane, and
   controlling the thrust regulation system based on an engine speed of the airplane.

7. The method according to claim 5, wherein controlling the automatic pilot and the thrust regulation system in the secondary modes further comprises:
   controlling the automatic pilot based on an angle of attack, and
   controlling the thrust regulation system based on an engine speed of the airplane.

8. The method according to claim 5, wherein the airplane includes slats and flaps moveable between extended and retracted positions to define smooth and sustained aerodynamic configurations that are complementary flight areas, and controlling the automatic pilot and the thrust regulation system in the secondary modes further comprises:
   when the airplane is in a smooth aerodynamic configuration defined by the slats and flaps being in the retracted position, using an attitude of the airplane and an engine speed of the airplane as the control parameters used to control the automatic pilot; and
   when the airplane is in a sustained aerodynamic configuration defined by the slats and flaps being in the extended position, using an angle of attack of the airplane and an engine speed as the control parameters used to control the automatic pilot.

9. An automatic device for aiding the piloting of an airplane, comprising:

an automatic pilot that is controlled as a function of a first information defined by an actual airspeed of the airplane, in a primary mode during normal operation of the airplane;

an airplane speed detection device including airspeed measurement sensors that measure the actual airspeed of the airplane to determine the first information;

a speed information validating device that determines whether the first information is lost by detecting if the airspeed measurement sensors have broken down or if measurements of the actual airspeed cannot be consolidated because only a single airspeed measurement sensor is operating correctly;

a flight data value determination device that determines additional flight data being independent from the actual airspeed of the airplane immediately upon detection that the first information is lost; and a control parameters determination device that determines, from the additional flight data, a set of control parameters used to control the automatic pilot in a secondary mode to thereby ensure the availability of the automatic pilot without any interruption caused by the first information being lost and without requiring additional action by crew members onboard the aircraft;

wherein immediately upon detection that the first information is available again, the automatic pilot is controlled in the primary mode again based on the first information such that operation of the automatic pilot is not interrupted by the first information being lost and then determined to be available again.

10. The device of claim 9, further comprising:

an alarm device configured to emit an alarm to the crew members of the airplane when the first information is lost.

11. The device of claim 9, further comprising:

a thrust regulation system of the airplane that is controlled in a primary mode based on the first information during normal operation of the airplane; and if the first information is lost, configured to be controlled in a secondary mode based on the set of control parameters.

12. The device of claim 11, further comprising:

slats and flaps moveable between extended and retracted positions to define smooth and sustained aerodynamic configurations that are complementary flight areas;

wherein when the airplane is in a smooth aerodynamic configuration defined by the slats and flaps being in the retracted position, an attitude of the airplane and an engine speed of the airplane are used as the control parameters used to control the automatic pilot; and wherein when the airplane is in a sustained aerodynamic configuration defined by the slats and flaps being in the extended position, an angle of attack of the airplane and an engine speed are used as the control parameters used to control the automatic pilot.

* * * * *